(12) United States Patent
Deutsch et al.

(10) Patent No.: US 11,579,002 B2
(45) Date of Patent: *Feb. 14, 2023

(54) SENSOR FUSION FOR FIRE DETECTION AND AIR QUALITY MONITORING

(71) Applicant: SAAM, INC., Indianapolis, IN (US)

(72) Inventors: Erik R. Deutsch, Brookline, MA (US); Joseph W. Huehnerhoff, Stanwood, WA (US); Jason Booth, Assonet, MA (US)

(73) Assignee: SAAM, Inc., Indianapolis, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,787

(22) Filed: May 17, 2022

(65) Prior Publication Data

US 2022/0276080 A1    Sep. 1, 2022

Related U.S. Application Data

(63) Continuation of application No. 17/587,932, filed on Jan. 28, 2022, now Pat. No. 11,340,097.

(60) Provisional application No. 63/143,639, filed on Jan. 29, 2021.

(51) Int. Cl.
| | |
|---|---|
| *G08B 1/08* | (2006.01) |
| *G01D 21/02* | (2006.01) |
| *G08B 25/10* | (2006.01) |
| *G08B 17/00* | (2006.01) |
| *G08B 21/14* | (2006.01) |

(52) U.S. Cl.
CPC .............. *G01D 21/02* (2013.01); *G08B 17/00* (2013.01); *G08B 21/14* (2013.01); *G08B 25/10* (2013.01)

(58) Field of Classification Search
CPC ........ G01D 21/02; G08B 17/00; G08B 21/14; G08B 25/10
USPC ........................................... 340/539.1
See application file for complete search history.

(56) References Cited

U.S. PATENT DOCUMENTS

| | | | |
|---|---|---|---|
| 9,871,692 B1 * | 1/2018 | Hutz | H04L 41/0681 |
| 11,175,233 B2 | 11/2021 | Hallack et al. | |
| 11,181,497 B2 | 11/2021 | Turnbull et al. | |
| 2014/0139342 A1 * | 5/2014 | Brown | F24F 7/065 340/603 |
| 2014/0320282 A1 * | 10/2014 | Zhang | G08B 7/066 340/502 |
| 2021/0116432 A1 | 4/2021 | Behm et al. | |

* cited by examiner

*Primary Examiner* — Tai T Nguyen
(74) *Attorney, Agent, or Firm* — Ulmer & Berne LLP; Alexander Johnson; Vance Vandrake

(57) ABSTRACT

A safety system for residential and commercial use includes a plurality of sensor modules that may be distributed about the environment, and that are in communication with a remote server environment and with other devices over a wireless communication network (e.g., cellular, Wi-Fi). Each sensor module includes a plurality of sensors that are capable of measuring or detecting characteristics of the environment such as smoke, small particulate, large particulate, chemicals, gasses, temperature, humidity, pressure, geolocation, and other characteristics. Analysis of sensor data is performed locally on the sensor module, as well as remotely on a server, in order to fuse and consider multiple sensor data points to identify emergency and non-emergency scenarios. By fusing and analyzing sensor data emergencies can be detected more quickly, and false alarms can be filtered out and avoided.

20 Claims, 8 Drawing Sheets

SENSOR FUSION FOR FIRE DETECTION AND AIR QUALITY MONITORING

CROSS-REFERENCE TO RELATED APPLICATION

This application claims the priority of U.S. Pat. No. 11,340,097, granted May 24, 2022, which itself claims priority to U.S. Provisional Patent App. 63/143,639, filed Jan. 29, 2021, each titled "SENSOR FUSION FOR FIRE DETECTION & AIR QUALITY MONITORING," the entire disclosure of each of which is incorporated herein by reference.

FIELD

The disclosed technology pertains to a system for safety sensors and systems.

BACKGROUND

Residential and commercial safety systems, such as those for fire and smoke detection, rely on narrow sets of data produced by a single sensor to provide alerts and/or report safety issues to a master system. As an example, an ionization style smoke detector detects the presence of smoke by sensing a change in electrical flow between two plates separated by a small gap. When smoke particles enter the small gap they disrupt and reduce the electrical flow, signaling to a control component of the smoke detector that an audible alarm should sound. While popular due the relative simplicity and affordability, such a sensor may be prone to false alarms due to conditions that do not rise to the level of a true emergency. For example, the presence of dirt, dust, cobwebs, humidity, and particulate matter within an ionization style smoke detector may cause a similar disruption of electrical flow and produce false alarms. False alarms have been shown to cause people to remove or deactivate their smoke alarms creating an unsafe situation.

What is needed, therefore, is an improved system for safety monitoring.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of health and safety sensors and systems. While the disclosed applications of the inventors' technology satisfy a long-felt but unmet need in the art of safety sensors and systems, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Implementations of the disclosed technology combine sensor data from different types of sensors measuring different metrics relating to the overall environment to enable a more accurate, complete, and dependable assessment of the situation than would be possible with singular sensors, or even multiple sensors if these sensors were used individually. Artificial Intelligence (AI), Machine Learning (ML), Chemometric modeling, multi-variate correlation, and other algorithms combine the multi-sensor data fusion enabling faster, and more accurate, detection of fire and other safety hazards while eliminating false alarms and better providing granular details on non-emergency air quality concerns. Cloud connectivity, IoT and AI/ML enable the device to continually improve detection algorithms in order to distinguish a false alarm from a life-threatening situation, and to alert preemptively when necessary.

Figure 1:
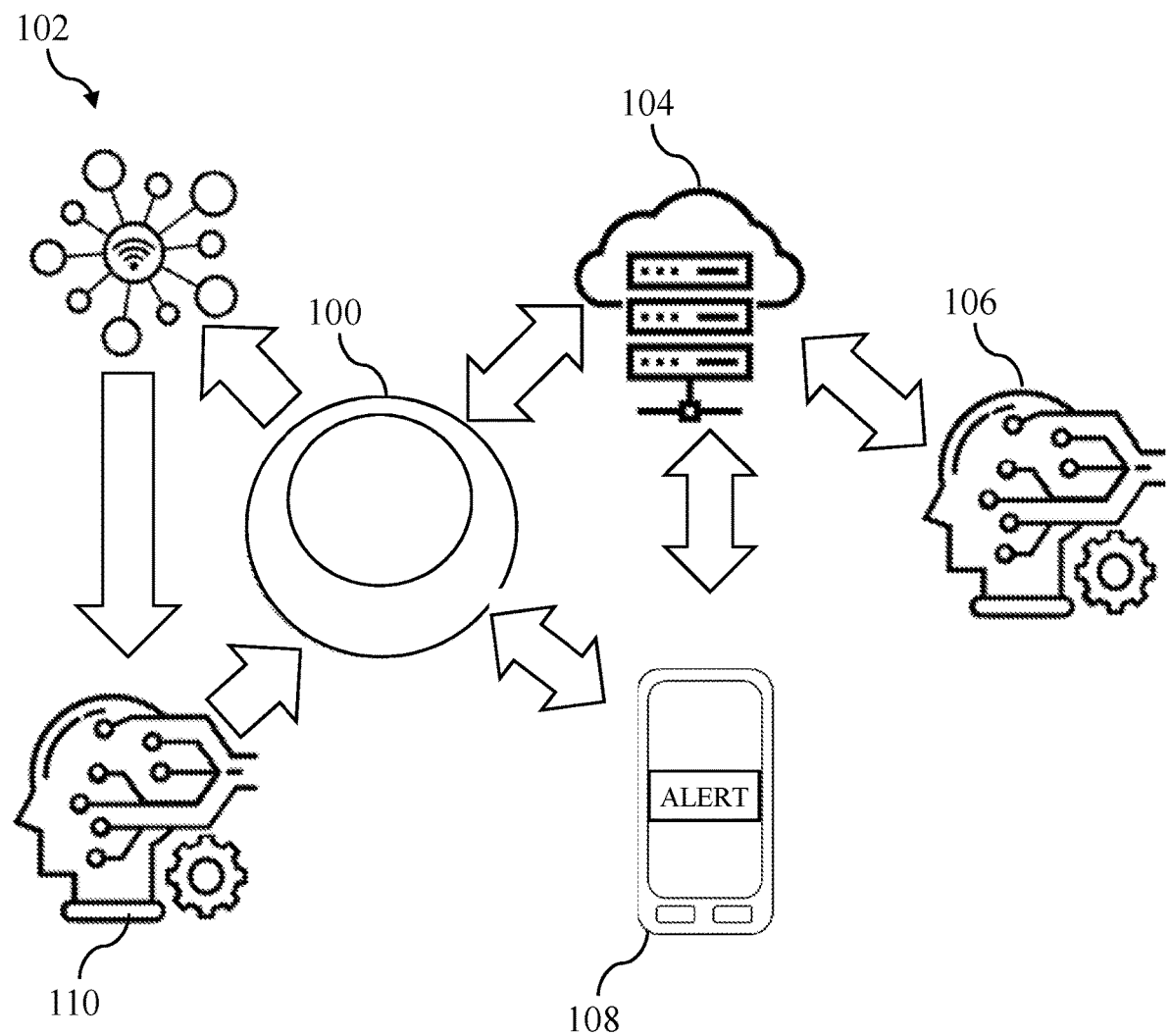
FIG. 1 is a schematic diagram of an exemplary system configured to detect environmental characteristics.

FIG. 1 shows a schematic diagram of a system that provides sensor fusion based alerts. One or more sensor modules (100) may be positioned within the environment, with each sensor module (100) having multiple sensors capable of measuring multiple characteristics of the environment. A set of sensor data (102) generated by the sensor modules (100) is analyzed by a sensor fusion prediction engine (110), and predictions are used to provide audible, visible, or other feedback or alerts via the sensor module (100). A plurality of sensor modules (100) may be in communication with a server (104), and sensor data (102) may also be reported to the server (104) for analysis by an artificial intelligence process (106) configured to identify actual or potential safety risks based on the data. Analysis of sensor data may be performed locally to the sensor module (100) and on the server (104) in parallel, with identified safety risks being acted upon when the parallel analysis reach consensus or are within a consensus threshold. The server (104) may provide the results of analysis to a user device (108) such as a smartphone, tablet, computer, or other computing device. The server (104) may include, for example, one or more physical servers, virtual servers, cloud servers, or other software environments. The user device (108) may receive analysis results via a software interface, electronic message, device notification, or other message. Analysis results may include both emergency situations (e.g., fire, carbon monoxide, hydrogen cyanide, hazardous hydrocarbon levels) as well as more general non-emergency air quality concerns (e.g., high levels of particulate matter, high pollen, and high humidity).

Figure 2:
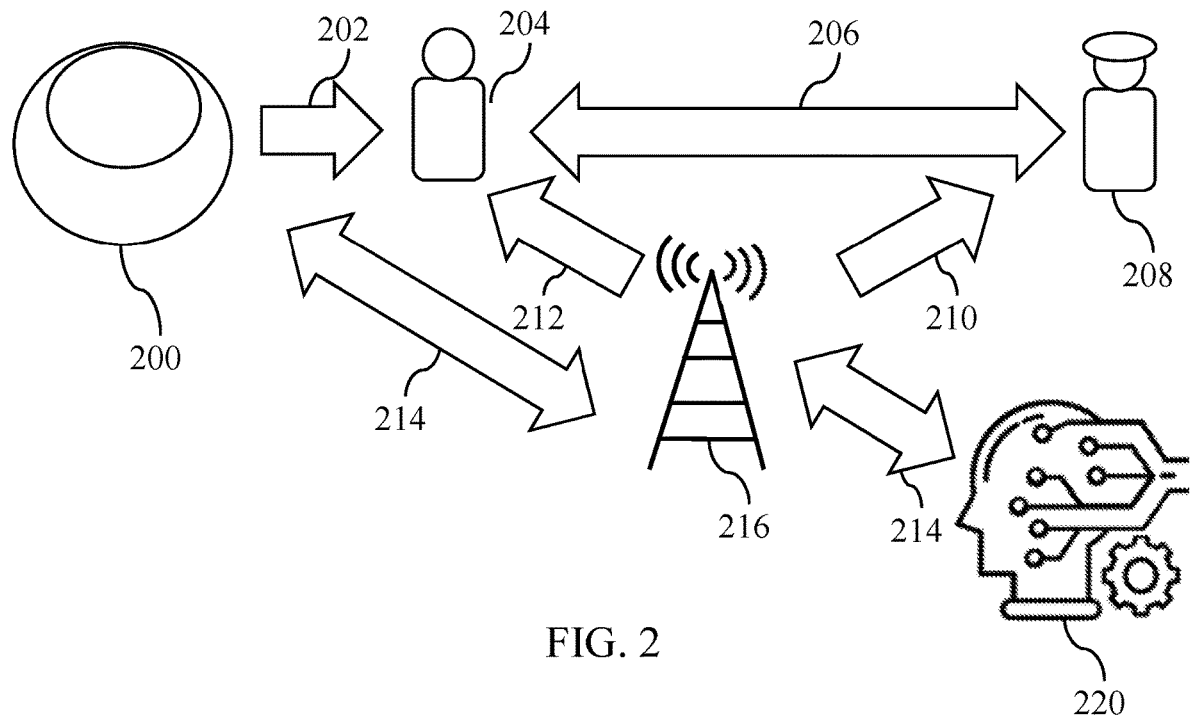
FIG. 2 is a schematic diagram illustrating use cases of the system of FIG. 1.

FIG. 2 is a schematic diagram illustrating several use cases of the fusion sensor system. A sensor module (200) may measure characteristics of the environment and perform chemical analysis, allergen analysis, particulate analysis, temperature analysis, gas analysis, light level analysis, and other analyses and may report any characteristics that exceed configured danger thresholds to a user (204) via direct audible and visible warnings (202). The sensor module (200) also communicates sensor data to a fusion analysis engine (220) for analysis via a continuous data stream (214) over a cellular or Wi-Fi communication network (216). The fusion analysis engine (220) analyses sensor data and provides warnings (212) to the user (204) via a smartphone or other user device in communication with the cellular, Wi-Fi network (216). The analysis engine (220) may also provide warnings, visualizations, chemical maps, environment maps, and other information (210) to first responders (208) or other emergency personnel via the cellular or Wi-Fi network (216). Such information may be mapped to the user's (204) environment based upon feedback from multiple sensor modules (200), such that the first responders (208) may be able to determine the locations of safe and unsafe areas within the environment. The system may also provide direct communication (206) between the user (204) and the first responders (208) via a software application on a user device in the event of an emergency.

In addition to receiving and analyzing information from the sensor module (200), the fusion analysis engine (220) may also receive information from user devices of the user (204) (e.g., location information, accelerometer information), other network connected devices in the home (e.g., smart enabled appliances such as stoves or ovens, smart security systems that include remote cameras, etc.), or third party sources such as weather or emergency broadcast services.

Figure 3:
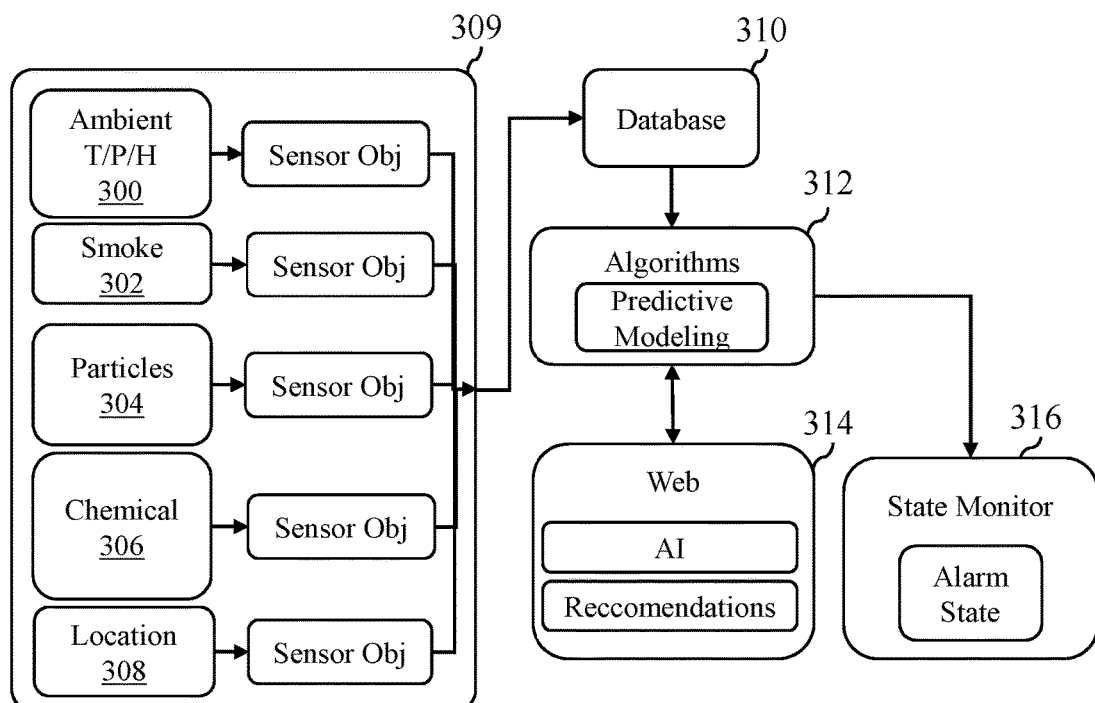
FIG. 3 is a flowchart of a set of high-level steps that a system could perform to detect and provide alerts using a fused sensor dataset.

FIG. 3 shows a flowchart of high-level steps that may be performed by the system. Sensor data may be derived from a plurality of sensor modules within an environment. Data gathered from sensors may include ambient sensor data (300), such as temperature, humidity, and pressure, smoke sensor data (302), as indicate by light intensity or other smoke sensors, particle sensor data (304), such as particular count within air, chemical sensor data (306), such as measurements of $CO_2$, CO, HC, HCN, $H_2CO$, NOx, and TVOC, and location sensor data (308) such as GPS and Wi-Fi based location data describing the location of the environment and/or locations of devices within the environment. Such data may be provided to a database (310) of a remote server, and predictive modelling may be performed (312) to identify emergency and non-emergency characteristics present in the data. Results may be provided to users and/or first responders as recommendations (314), and a state monitor may also determine whether to provide audible or visible warnings (316) via the plurality of sensor modules, a plurality of user devices, or both.

With further reference to FIG. 3, in the first layer (309), each of the sensors and location data is collected and processed. The data is then passed to the database (310) for storage and retrieval. An algorithm block (312) reads from the database (310) and runs the data through a model which predicts whether or not there are any events to report. This data, as well as the prediction, is passed up to the cloud/web (or to a local master control unit) where it can be combined with additional information, such as the data collected by another detector in another area of the building (314). This combined data is run through a separate model which can communicate back to the device if needed to provide enhanced situational awareness. Finally, this prediction informs a state monitor to set the appropriate state of the device based on whether or not there is any predicted alert or alarm conditions (316).

Sensor capabilities may include sensors for Temperature (T), Pressure (P), and Humidity (H) or combined (T/P/H). A set of sensors within one or more sensor modules could measure Temperature, Pressure, and/or Humidity as individual sensors or any combination of sensors in a single chip using a measurement technique. These readings are valuable pieces of information, and provide information about ambient conditions of the scene. As an example, temperature could rise if there was a fire. Pressure reduction could be indicative of burning oxygen. Humidity increase could be the result of a shower or burning frozen food which have been shown to set off nuisance alarms in traditional smoke detectors. T/P/H also give an indication of overall air quality related to non-emergency factors in the environment.

Particle sensors for large particles could be capable of measuring any size particle greater than 1.0 micron in root-mean-squared diameter. This could include measurement by chemical detection cell using spectroscopy, NDIR or other techniques. As an example, large particles may indicate the presence of pollen, bacteria, spores, and pet dander, which can cause allergy symptoms. Medium particles may indicate the presence of mold, smoke, smog, bacteria, and fine dust, which can cause allergy symptoms. The combination of particles and high humidity is an indication of mold spores and may indicate the need to do further testing for specific molds. Particles are indicative of air quality, but it can also be an independent check to the small particle sensor to aid in false alarms. Different types of fires emit different sized particles, and so combinations of particle data and other data (e.g., temperature, pressure, chemical) may be used to further screen alarm conditions.

Particle sensors for small particles could include photoelectric smoke detectors using a single or dual channel (or more) or particle detector looking at particles less than 1.0 micron in diameter or ionization smoke detectors which also look for particles in the air. Photoelectric technology works by light shining across a sensing chamber, Smoke enters the chamber, reflecting light, and reflected light shines on the light sensor, triggering the alarm. Typically photoelectric technology is slow to respond to fast-flaming fires. Ionization particle detection works by having a radioactive material between electrically charged plates which ionizes the air and causes current to flow between the plates, and when smoke disrupts the flow of ions the flow of current is reduced and triggers the alarm. Typically ionization technology is slow or does not respond to smoldering fires. As further example of sensor fusion combination, photoelectric and ionization false alarms could be reduced by eliminating alarms in situations where there is an increase in humidity in conjunction with other information that, in isolation, might suggest a fire. Small particle detection could also be measured directly in a chemical detection cell using appropriate illumination source and detectors.

Chemical detection sensors may include sensors such as those described in U.S. Pat. Pub. 2020/0348225A1, titled "Sensor System for Multi-component Fluids," U.S. Pat. No. 10,241,095, titled "Multi-Component Gas and Vapor Monitoring Sensor", and/or U.S. Pat. No. 10,663,441, titled "Multi-Component Gas and Vapor Monitoring Sensor," issued May 26, 2020, the entire disclosure of each of which is hereby incorporated by reference herein. The current proprietary technology enables the detection of lower concentrations of gases and measures many chemicals at the same time enabling it to be multi-functional while being low cost enough to meet the cost targets of a consumer application such as a smoke detector and/or air monitor.

Chemical sensors could include Pellistor Gas Sensors, Infrared Gas Sensors, Metal Oxide (MOS) Gas Sensors, ChemFET, Electrochemical Gas Sensors, Optical Particle Monitor Gas Sensors, PID/FID, Laser Spectroscopy, Photoacoustic Spectroscopy, thermal, CNTs (carbon nanotubes) or graphene, NDIR, MEMS sensors, FTIR sensors, etc.

Gases that may be detected and used in analysis for emergency situations such as a fire, or non-emergency situations such poor air quality, may include formaldehyde, which can be released from new furniture or building materials and is a carcinogen. Measured and analyzed gases may also include Volatile Organic Compounds (VOCs), which can increase cancer risk and cause a variety of severe adverse health effects, and which are generated in a fire. Measured and analyzed gases may also include Carbon Dioxide (CO2), which can cause drowsiness and, in increased concentrations, headaches, sleepiness, poor concentration, loss of attention, increased heart rate, and slight nausea, and which may be generated in a fire. Measured and analyzed gases may also include Carbon Monoxide (CO), which is odorless and can cause fatigue, headaches, and flu-like symptoms and unconsciousness in increased concentrations, and which may be generated in a fire. Measured and analyzed gases may also include Hydrogen Cyanide (HCN), which is released during fires by the burning of polyurethane and can cause weakness, headaches, confusion, vertigo, dyspnea, and, occasionally, nausea and vomiting. Measured and analyzed gases may also include hydrocarbons (e.g., propane/methane) which would be indicative of a gas leak and detection would enable preemptive warning before a fire/explosion occurs.

Location awareness sensors may include user devices having GPS capability, Wi-Fi or Bluetooth triangulation and location capability, or other location sensor. GPS can be used to locate a portable device carried by a person and may alert emergency personnel and interface to the emergency alert system to alert nearby people. Multiple IoT devices spread about the environment may communicate over a network to form basis set for artificial intelligence and machine learning algorithm on macro scale. These multiple devices can communicate to the internet via conventional WiFi and/or Cellular Signals (i.e. GSM), or may communicate independently via long range RF protocols (i.e. LoRaWAN).

Figure 5:
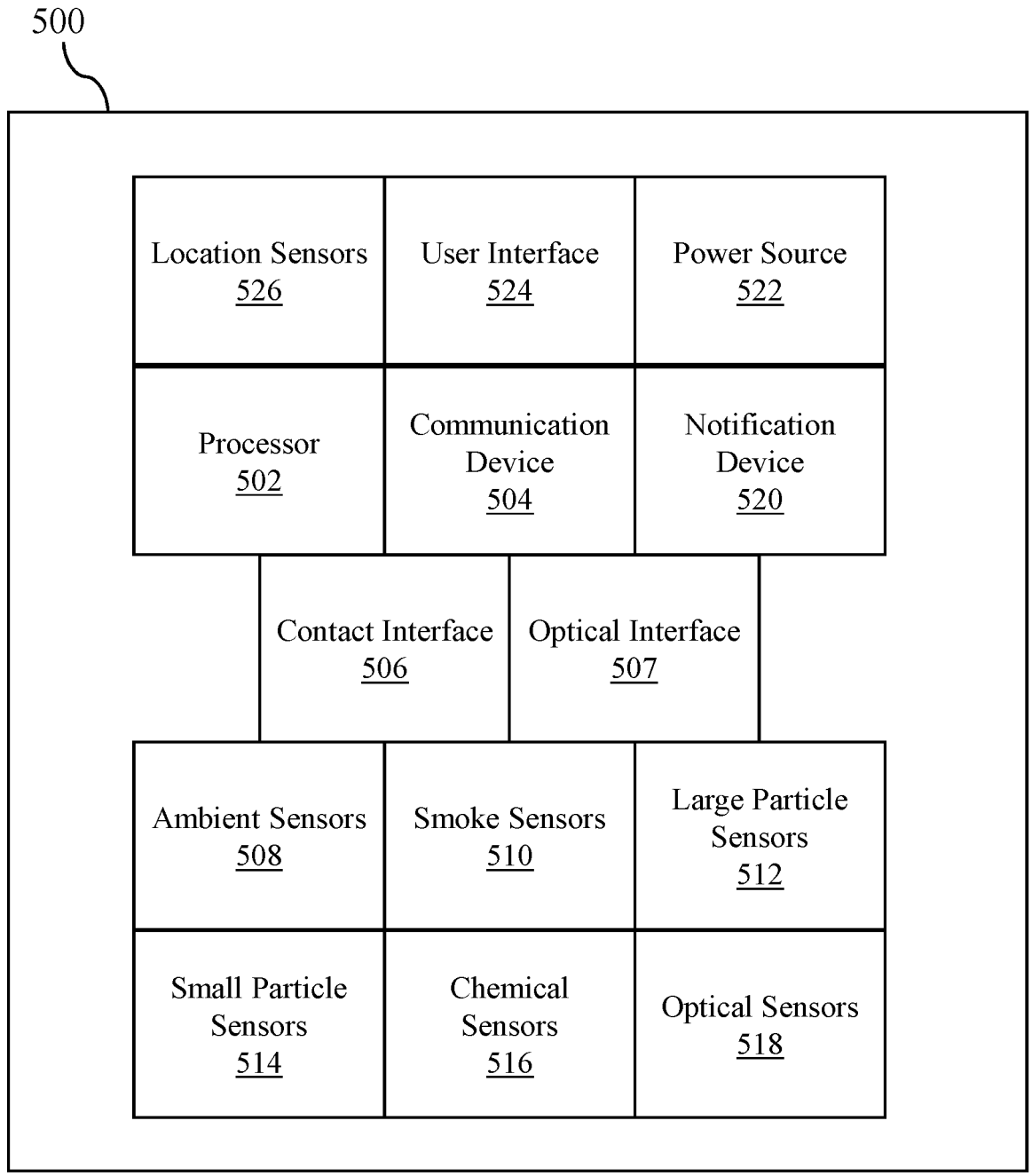
FIG. 5 is a schematic diagram of an exemplary sensor module.

FIG. 5 shows an example of a sensor module including the above described sensors. A housing (500) of the sensor module may be implemented in varying shapes or sizes (e.g., such as the sensor module (200) of FIG. 2), and may include one or more interfaces that allow internal sensors to interact with the ambient environment. A contact interface (506) may provide direct contact between the outside environment and one or more internal sensors, and may be implemented as an airway that passively or actively provides airflow from the outside environment to those sensors. The contact interface (506) may operate based on passive airflow, or may include fans, pumps, or other displacement devices capable of actively drawing air, and may also include multiple channels through which air may pass for measurement by discrete sensors (e.g., such as a manifold that splits a single flow of air into two or more channels associated with different sensors). An optical interface (507) may provide optical contact between one or more internal sensors and the outside environment, and may include, for example, an aperture or transparent cover that allows the passage of light (e.g., either bi-directional, such as a laser projection/reflection object sensor, or unidirectional, such as a light sensing motion detector).

The housing (500) may include one or more processors (502) as well as memories or storage devices, and one or more communication devices (504), such as Wi-Fi, Bluetooth, or cellular transceivers, as well as other wireless or wired communication devices, channels, or interfaces. One or more notification devices (520) may be present within or on the exterior of the housing (500), and may include, for example, light indicators, audio indicators, or other devices that provide cognizable alerts. One or more locations sensors (526), such as GPS receivers, Wi-Fi triangulation transceivers, or other wireless or beacon based location sensors may be within the housing (500), and may be configured to generate sets of location data that may be provided to the process (502) and/or other devices via the communication devices (504). One or more user interfaces (524) may be accessible on the housing (500), and may include buttons, displays, touchscreens, illuminated status indicators, or other controls or outputs allowing a user to interact with the device or receive information related to the device. The housing (500) may also include a power source (522), which may be, for example, one or a combination of replaceable batteries, rechargeable batteries, solar power sources, or hardwired electrical connections.

Other sensors included in the housing (500) may include ambient sensors (508) (e.g., temperature, humidity, pressure, and air circulation sensors), smoke sensors (510) (e.g., photoelectric and ionization smoke sensors), large particle sensors (512) (e.g., configured to detect pollen, bacteria, spores), small particle sensors (514) (e.g., configured to detect smoke or other particulate produced by a fire), chemical sensors (516) (e.g., configured to detect VOCs, CO2, CO, HCN, and other chemicals), and optical sensors (518) (e.g., externally facing motion, object, proximity, or other sensors).

Traditional smoke alarms are passive—continually monitoring the air for smoke but not providing any added value in the absence of a fire emergency. Air monitors typically look for individual ambient conditions such as T/P/H, CO2, or CO. Each of these individual readings is informative in isolation, but provides little additional value. Conversely, a fusion combination and analysis of these sensor readings not only enables a single device to provide health, safety, and fire detection but enables it to do so more quickly while eliminating false alarms. Multiple sensor inputs enable Artificial Intelligence and Machine Learning to evaluate the individual/absolute levels of chemical, particle, or ambient conditions, the rate of change of chemical, particle, or ambient conditions, and the combination of sensor inputs indicative of real-life scenarios that might be harmless or enable preemptive warning of a hazardous situation enabling earlier response and/or intervention. Output from chemical detection, particle detection (e.g., smoke/fire/other), ambient conditions detection algorithms along with other sensor data such as room location/type are combined at a remote server where one or more analysis processes may be executed to determine actual or potential alerts related to the data.

The Internet of Things (IoT) brings together sensors, software, electronics and connecting to the internet/cloud from the embedded software and sensor interfaces. Artificial Intelligence (AI) & Machine Learning (ML) focus on the sensor fusion required to more quickly predict fire while eliminating false alarms and providing chemical detection and air monitoring capability for health & safety. Super Sensor Fusion brings together sensors from multiple devices which when aggregated to the cloud with deep Machine Learning & Artificial Intelligence to provide advanced situational awareness.

In order to detect a fire or other potentially dangerous situation quickly, with less false alarms, a predictive model may be used. The predictive model may be implemented using expert systems, machine learning systems, or other analytic engines. As an example, a supervised machine learning algorithm may be trained using a training dataset that includes diverse sets of sensor data illustrating various alarm and false alarm scenarios upon implementation, and then may be further trained over time as more data is collected from users of the system. The training dataset will be provided to simulate different controlled real-world scenarios. This dataset will include current levels of all of the sensors as well as the rate of change of these sensors over selected time frames. The data will then be processed, normalized, classified into different levels of concern. Finally, this will all be fed into a machine learning algorithm to create a predictive model. This model will then be used to predict these same classifications (e.g., levels of concern based upon individual and fused sensor data points) in real-time, during operation in an unknown, uncontrolled state.

Specific models to that may be used include decision tree classification, support vector machine, and an artificial neural network. A decision tree is a model in which the data is continuously split based on a specific parameter. The tree is grown using an algorithm which makes a series of locally optimal decisions about which parameter to use to split the data. A support vector machine is a model which attempts to find a hyperplane in N-dimensional space which distinctly classifies the data set. In this case N is the number of sensors and the dataset is transformed using the kernel trick to optimize the boundaries between the classifications. An artificial neural network is a series of connected processing units. These processing units are developed during a training procedure which identifies patterns in the data.

Figure 4:
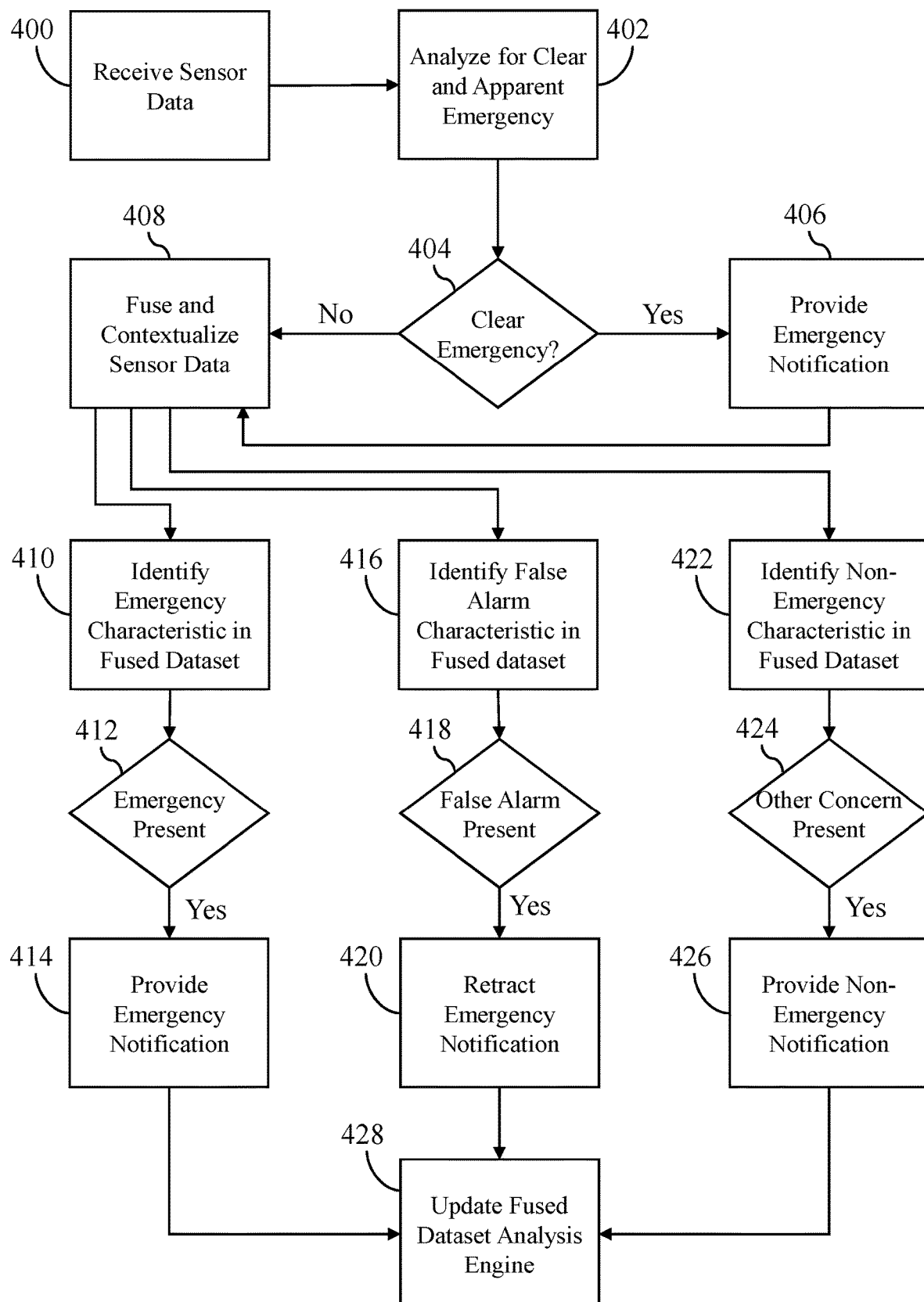
FIG. 4 is a flowchart of a set of steps that a system could perform to detect and provide alerts using a fused sensor dataset.

FIG. 4 shows a flowchart of a high-level set of steps that may be performed to provide safety alerts based on fused data sets, as has been described. The steps of FIG. 4 may be performed by a remote server (104), a plurality of sensor modules (100), or both, with discrete steps being performed by one processor or device or several processors or devices in parallel as part of a local/remote consensus process. The system may receive (400) sensor data from the sensors of one or a plurality of sensor modules. The received sensor data will contain at least two discrete types of sensor data (e.g., temperature and particle, chemical and particle, etc.) and may contain as many as ten or more discrete types of sensor data, as has been described, where each discrete type of sensor data measures a different characteristic of the overall environment than the others, regardless of their location within the environment (e.g., temperature data, humidity data, pressure data, chemical data, small particle data, large particle data, and others are each discrete types of sensor data).

As sensor data is produced or received (400) it may be rapidly analyzed (402) at a very high level for clear and apparent emergencies. As an example, this pre-analysis (402) may be performed by simple and efficient expert systems configured to check for measurements, typically of a single discrete type of data, that almost certainly indicate an emergency and have no reasonable likelihood of being a false alarm (e.g., extremely high temperature, extremely low oxygen levels, extremely high levels of dangerous gases). Where configured thresholds are exceeded (404) during pre-analysis (402) the system may immediately provide (406) some type of emergency notification before proceeding to more in depth analysis. Provided (406) notifications may include visible and audible signaling by sensor modules, sensor module hubs or other devices, user devices such as smartphones, or other IoT devices that have been configured within the environment and associated with receiving a notification (406). Provided (406) notifications may also include electronic notifications to first responders, emergency contacts, neighbors, or other recipients whose contact information has been provided to the system.

Where pre-analysis (402) does not indicate a clear emergency (404), or after providing (406) an emergency notification, the system may fuse and contextualize (408) the received set of sensor data. This may include organizing the data set to be stored by a database, set of objects, or data model, and identifying and creating associations between particular data points that have relevance to those objects or models. Once fused and contextualized (408), the fused data is prepared to be queried or analyzed by one or more analysis engines which may include expert systems, machine learning systems or other artificial intelligences, or fuzzy logic systems, for example.

During analysis, the system may identify (410) one or more emergency characteristics within the dataset, where an emergency characteristic might include data of two or more discrete types at a moment in time, or over a period of time. While examples of emergency characteristics that may be identified based upon fused data have been provided above, additional examples may include smoke particle detection plus one or more of gradual temperature increase, gradual oxygen decrease, gradual humidity decrease, and gradual increase in one or chemicals or gasses associated with a fire. Another example of an emergency characteristic may be gradual increase in carbon monoxide or another toxic gas combined with location data from multiple discrete sensor modules indicating the spread of carbon monoxide from an area within the environment that is associated with a furnace or other equipment associated with producing such gases during unsafe operation.

Where the system determines that an emergency characteristic is present (412), the system may provide (414) one or more emergency notifications, as has been described. Emergency characteristics (412) may be based upon fused sensor datasets and various thresholds or confidence ratings based upon the fused data. In such implementations, different types of sensor data may be given more weight than others, with such weighting being static or changing across the band of the measurement. As an example, the presence of VOC's or HCN gas is a very strong indicator of a fire, whereas temperatures changes may be normal or abnormal based upon such factors as the season, local weather conditions, and other factors. Each unique type of emergency characteristic will have its own fingerprint or appearance within the sensor data, which may be identified and developed by the system over time. Emergency notifications provided (406) based on pre-analysis may be distinguishable from those later provided (414) based upon full analysis. As an example, electronic messages may initially indicate "Potential fire at 123 Home Ave." while later electronic messages may indicate "Confirmed fire at 123 Home Ave." Similarly, sensor modules may provide varying feedback based upon the type of emergency notification (e.g., a yellow light or chirping sound in response to initial notifications, a red light or alarm sound in response to confirmed notifications). Emergency notifications may also include automation signals that may be provided to other devices in communication with the system, such as network enabled smart lighting, HVAC systems, door and lock mechanisms, and other devices. As an example, an emergency notification might cause all of the lights in a residence to turn on, might cause an HVAC system to vary its operation to either provide fresh air, or starve a fire of oxygen, or might cause an automatic door opener or door lock to engage and provide easier escape from the residence.

Another example of analysis of the fused dataset may include identifying (416) false alarm characteristics in the dataset. False alarm characteristics may be identified (416)

based on fused data points that, in isolation, may indicate an emergency, but when considered as fused data may instead indicate a sensor error or other non-emergency situation. Examples of false alarm characteristics may include, for example, particulate data indicating the presence of smoke combined with location data from other sensor modules positioned nearby the data source that do not indicate smoke, or particulate data indicating smoke combined with temperature data showing no change in temperature, or particulate data indicating no presence of smoke combined with temperature showing a sudden increase in temperature, or particle and humidity rising with no chemical change indicating a cooking scenario. Other false alarm scenarios may include, for example, sensor data indicating the presence of smoke, but a lack of chemicals or gases related to a fire, increases in humidity paired with sensed smoke (e.g., such as may be caused by a shower, where water vapor in the air falsely registers as smoke). Where a false alarm is present (418) the system may retract (420) any related emergency notifications may have been previously provided (406), which may include disabling audible or visible alarms on one or more devices, or providing electronic messages to residents, first responders, or other parties that may have previously received an emergency notification indicating that there is no emergency. False alarms (418) may also be manually identified by users of the system, and may provide additional information such as answers to questionnaires about their activities at the time of the false alarm, or additional sensor information, which may be used by the system to more accurately distinguish the false alarm in the future.

Another example of analysis of the fused dataset may include identifying (422) non-emergency characteristics in the fused dataset. Non-emergency characteristics may be identified (422) based on fused data indicating unhealthy or uncomfortable characteristics of the ambient environment or air quality. Examples of non-emergency characteristics may include, for example, humidity outside of a configured range, temperature outside of a configured range, particulate data showing a high particulate count of dust, mold, or other contaminants, chemical data showing the presence of certain chemical gases outside of a configured range, and combinations thereof. An example of a non-emergency characteristic may be, for example, high humidity plus particulate data indicating the presence of mold. Where any environmental quality concern is present (424), the system may provide (426) non-emergency notifications to one or more devices or recipients. Provided (426) notifications may include, for example, identification of the quality concern, suggestions for addressing the quality concern, and other information related to the quality concern.

After any analysis occurs (410, 416, 422), the system may update (428) aspects of the analysis engine based upon the results of such analysis and/or feedback from users of the system. This may include feedback from owners or users of the system, first responders associated with a recent notification, or others confirming or calling into question the characteristics previously identified (410, 416, 422) by the system. As one example, after identification (410) of a fire within a residence, a user of the system associated with the residence may provide feedback indicating that there was actually a fire, and the system may update (428) the analysis engine to reinforce identification of a fire in future instances that include similar sensor data. Conversely, where the feedback indicates no fire, the system may update (428) the analysis engine to reduce the likelihood that an emergency will be identified in a future instance that includes similar sensor data.

Figure 6A:
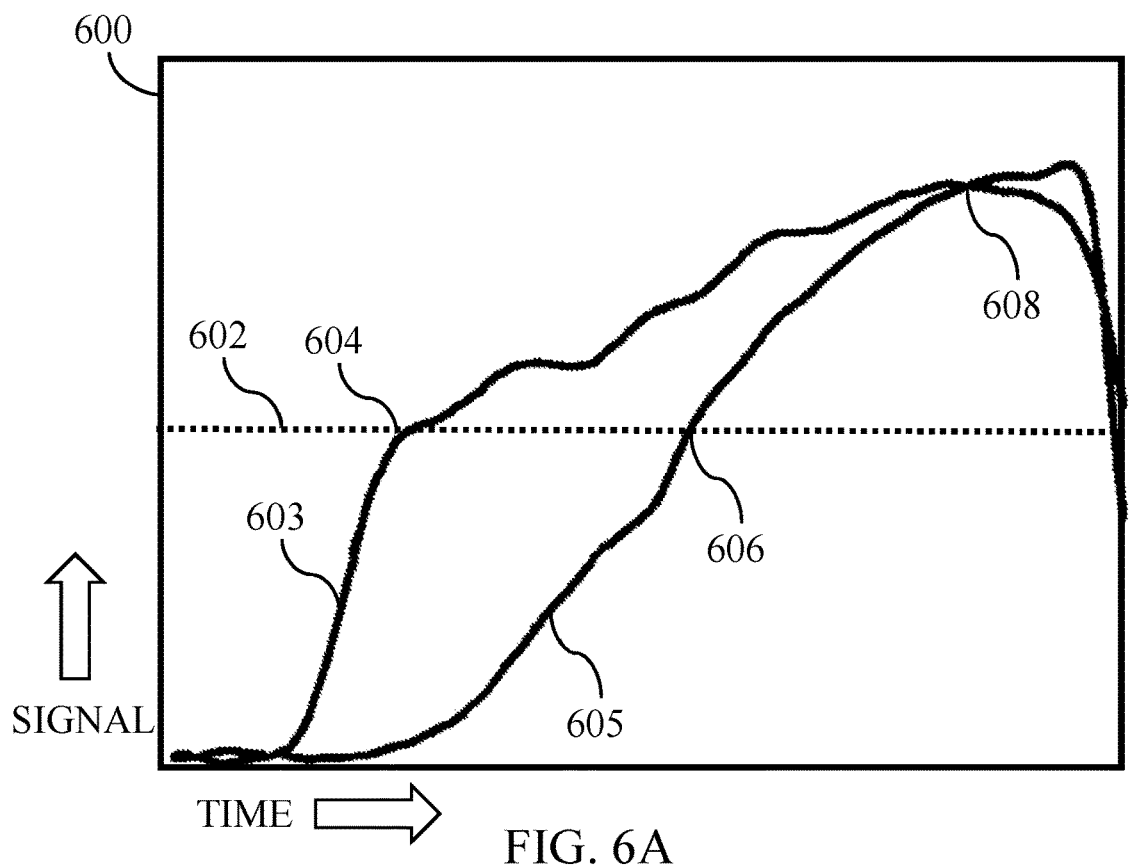
FIGS. 6A-6C each show graphs illustrating exemplary use cases of a fusion sensor system compared to traditional photoelectric sensors.
Figure 6B:
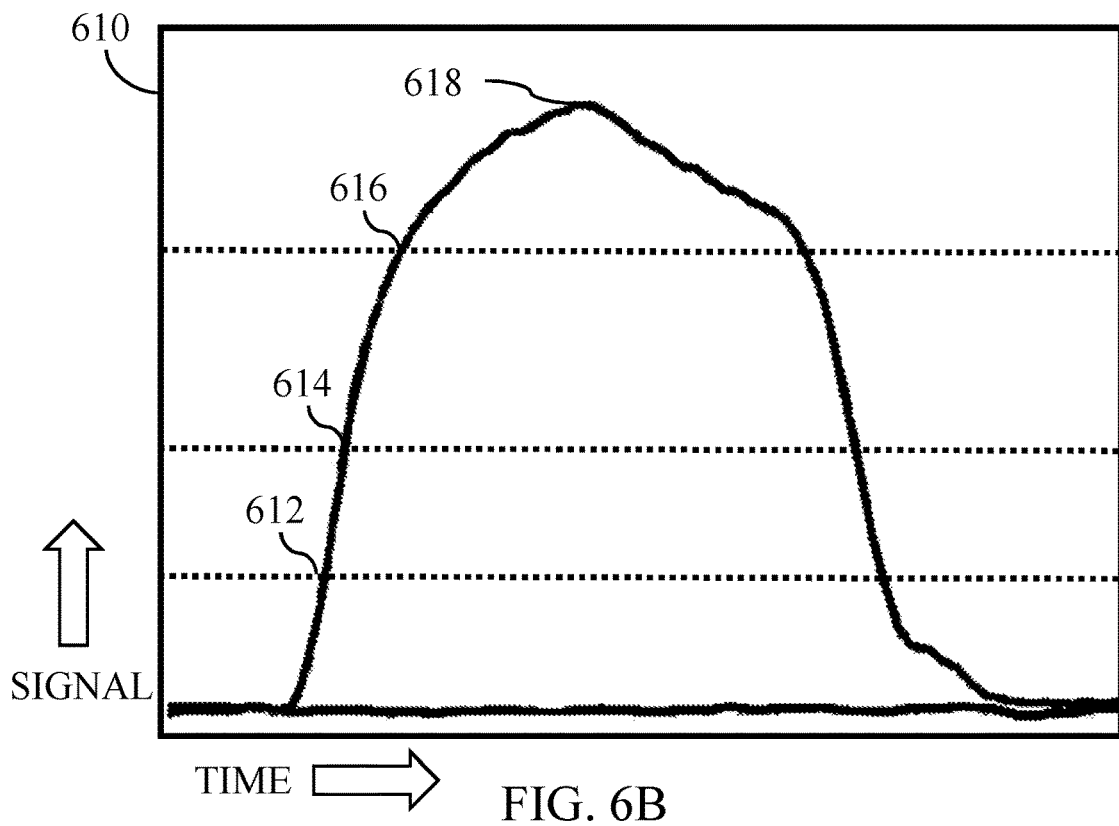
Figure 6C:
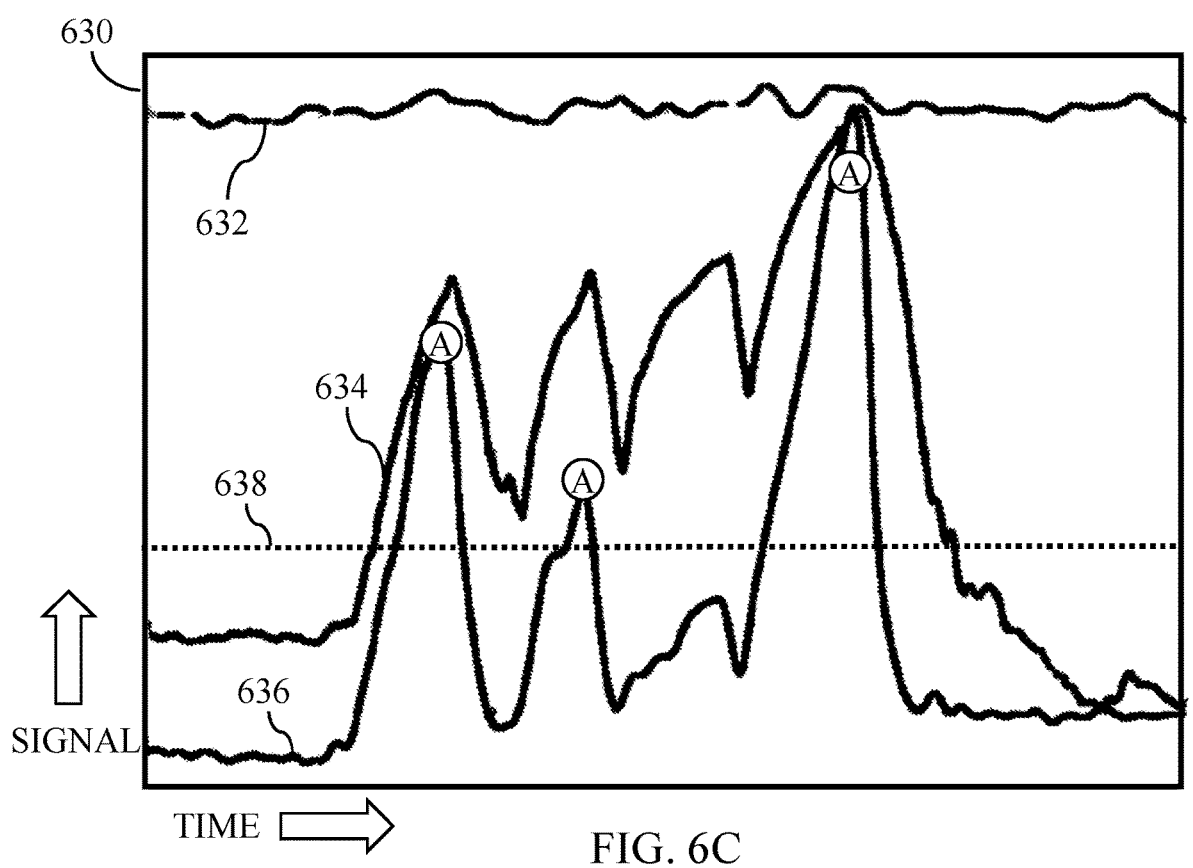

FIGS. 6A through 6C illustrate uses cases for a fusion sensor system with comparisons to a traditional photoelectric sensor. FIGS. 6A through 6B show signal feedback (e.g., which, above a certain threshold (602), triggers an alert) over time for a sensor module such as that illustrated in FIG. 5 and a traditional photoelectric sensor during various scenarios. FIG. 6A illustrates a fast flaming scenario (600), where the sensor module signal (603) rapidly approaches and exceeds the threshold (602) at around 28 seconds (604) resulting in an emergency alarm, while the photoelectric sensor signal (605) gradually approaches the threshold (602) and finally triggers an alarm at around 100 seconds (606). The sensor module signal (603) also rapidly falls off at around 200 seconds (608), corresponding to venting of the scenario space and introduction of clean air, while the photoelectric signal (605) continues to rise. The sensor module signal (603) reaches alarm levels more quickly due to the sensor fusion dataset used, which includes data from the chemical sensor as well as one or more other sensor capabilities (e.g., particulate sensor, humidity, temperature, etc.). Thus, in this manner, a particulate sensor reading below an alarm threshold level may be combined with rising chemical sensor data and temperature and decreasing humidity to identify a fire emergency long before the smoke sensor signal alone reaches alarm thresholds.

FIG. 6B shows sensor feedback (610) during a gas leak scenario. A traditional photoelectric sensor shows no change or alarm throughout the scenario, while the signal from a sensor module reaches various thresholds throughout the scenario. At a first threshold (612) the sensor module warns of an increase in detected hydrocarbons around 12 seconds. At a second threshold (614) the sensor module triggers an unsafe conditions warning (614) around 20 seconds, as detected hydrocarbons continues to increase (e.g., which may also be paired with a lowering of detected oxygen levels). At a third threshold (616) the sensor module triggers a catastrophic event warning at around 50 seconds. At around 100 seconds (618) the scenario ends and the environment is vented to introduce clean air.

FIG. 6C shows sensor feedback (630) during a cooking scenario involving food being cooked within a closed test chamber (e.g., to simulate food being cooked in an oven). During the course of cooking, the controlled environment is opened several times, such that each spike in sensor signal (634, 636) can be viewed as an independent test. Signal feedback from separate sensors such as might be combined in a single sensor module is shown. A first sensor signal (632) may be from temperature sensor, while a second sensor signal (634) may be from a humidity sensor. A traditional photoelectric sensor signal (636) is also shown, and an alarm threshold (638) indicates the level at which an alarm will be triggered based solely on the traditional photoelectric sensor signal (636). Three of the four independent tests shown in (630) show the traditional smoke sensor triggering an alarm based on sensor signal (636), illustrated as a circled "A" on the graph. The second sensor (634) shows corresponding increases in signal, indicating a rise in detected humidity that corresponds with each rise in detected particulate. Meanwhile, the third sensor signal (632) shows very little change corresponding to the tests, indicating that very little change in temperature was detected in combination with the increase in humidity and increase in particulate. When the particulate signal (636) is fused with the temperature signal (632) and/or the humidity signal (634) to provide a fused sensor dataset, the sensor module is able to determine that the resultant signals are not indicative of an emergency, and so may avoid triggering a false alarm.

In particular, the sensor module may readily determine that the fused sensor dataset does not match that expected in an uncontrolled fire (e.g., rising particulate, rising temperature, small to moderate changes in humidity that are sustained over time), and instead matches that expected in a cooking scenario, such as cooking a high-moisture food in an oven where the door is opened and closed several times (e.g., rising particulate and rising humidity each time the door is opened, while overall temperature remains steady).

The fused sensor dataset advantageously provides both a comparable value (e.g., the first signal (632) that can be used to determine the criticality of the detected smoke, as well as a temporal aspect to the data that can be used to recognize a pattern or change over time that is inconsistent with a fire emergency. When used herein, a pattern should be understood to mean any contextualized correspondence of discrete data points, and may include, for example, a set of threshold values or ranges that each of several data points may fall within and that have particular relevance when occurring simultaneously and within context of each other. Such patterns may be pre-configured as part of an expert module, may be trained or identified by an artificial intelligence, or may otherwise be configured. For example, analysis of the second signal (634) locally to the sensor module or by a remote system will identify the sharp peaks as being inconsistent with an uncontrolled fire emergency due to the repetition over time, and the sharp decrease of detected smoke each time the oven door is closed. In comparison, the traditional photoelectric signal operates on a simple threshold basis without regard to other sensor data or the changes or patterns of the signal over time.

Figure 7A:
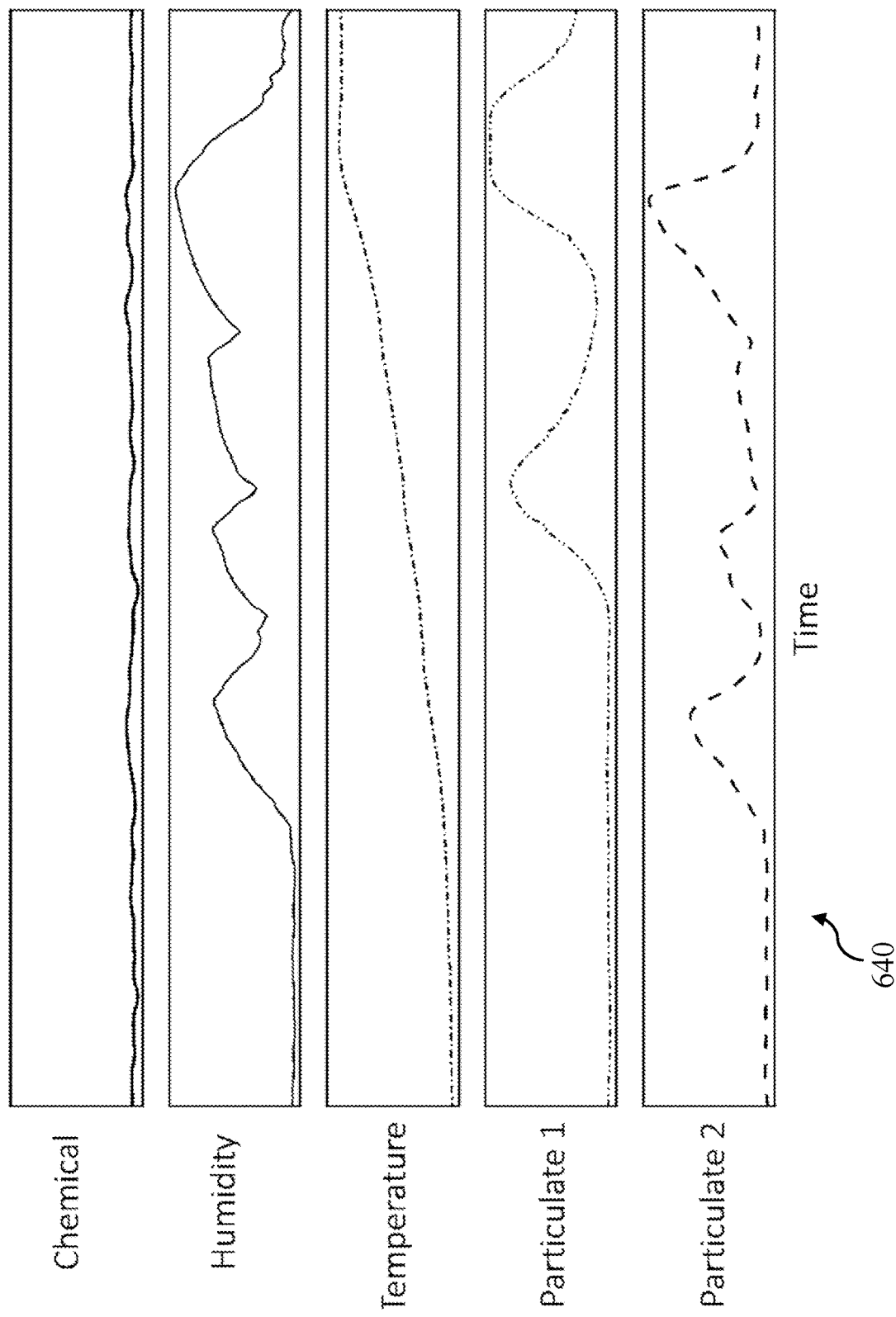
FIG. 7A-7B each show additional examples of graphs illustrating exemplary use cases of a fusion sensor system.

FIG. 7A illustrates a time graph of sensor data (640) during another cooking scenario, with a sensor module having five separate sensor capabilities: chemical, humidity, temperature, particulate 1 (e.g., large particulate), and particulate 2 (e.g., small particulate). As can be seen, detection of potentially harmful or toxic chemicals ($CO_2$, CO, HC, HCN, $H_2CO$, $NO_x$, and TVOC) remains largely stable throughout the timeline, which is a strong indication that an emergency fire scenario is not occurring. Humidity levels rise and fall several times such as might be expected with an oven door opening, or high moisture ingredients being added to a hot skillet, whereas humidity levels would be expected steadily rise during an emergency fire scenario. Temperature levels rise steadily throughout the cooking scenario, indicating a slow heating action resulting from a kitchen gradually warming, rather than a sudden spike of temperature such as would be expected during an emergency fire scenario. Particulate 1 levels rise and fall without any clear correspondence to any other dataset, whereas they would be expected to steeply rise and stay high during an emergency fire scenario. Particular 2 levels rise and fall with some correspondence to humidity levels, whereas during an emergency fire scenario they would steeply rise and stay high, and would have no correspondence to humidity levels. The scenario signature of high humidity, particulate matter, and no hazardous chemicals is a clear indicator of cooking.

Figure 7B:
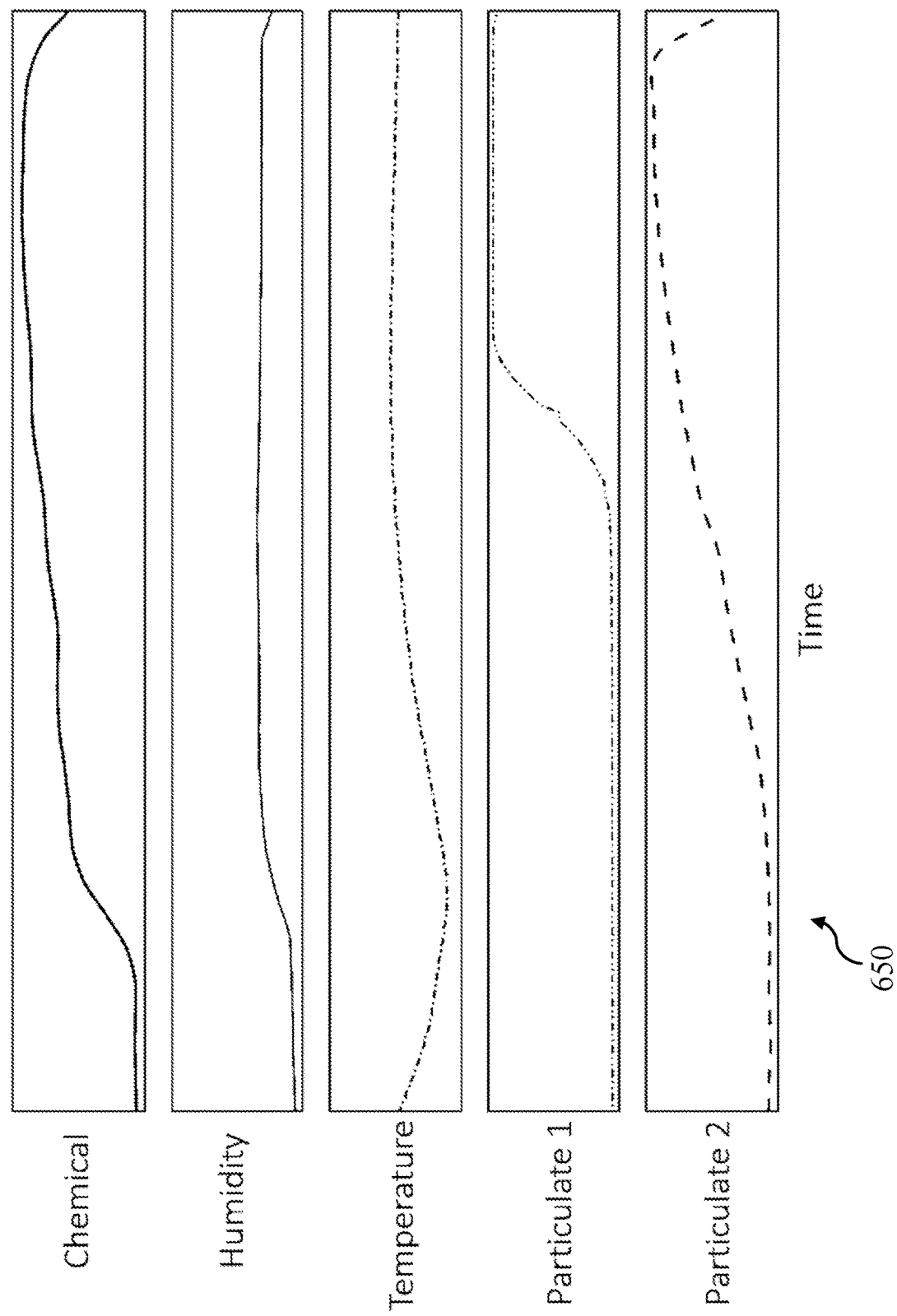

FIG. 7B illustrates a time graph of sensor data (650) during an emergency fire scenario, with a sensor module having five separate sensor capabilities: chemical, humidity, temperature, particulate 1 (e.g., large particulate), and particulate 2 (e.g., small particulate). As can be seen, detection of potentially harmful or toxic chemicals ($CO_2$, CO, HC, HCN, $H_2CO$, $NO_x$, and TVOC) increases steadily throughout the scenario with several sudden spikes, which is a strong indication that an emergency fire scenario is occurring. Humidity levels rise steadily and then are stable, instead of showing sudden spikes and drops. Temperature levels rise steadily and then are stable, indicative of the early stages of an emergency fire scenario. Particulate 1 and particulate 2 levels lag behind sensed chemical levels, and then each quickly rise, showing a clear correspondence between the two. This sensor dataset is indicative of a fire scenario; whereby, combustion converts a material into heat and smoke along with chemical gases. The steep rise in hazardous gases is the first clue to an unsafe condition, but not yet fire. A minimal rise in temperature is indicative of a spatially distance heat source, or a smoldering heat source. The rise in particulate matter is indicative of smoke in the air. Based on the instantaneous sensor input this could be characterized by two differing events: (1) automotive exhaust or (2) fire. By analyzing the time delay between the chemical and particulate, as well as, the relative intensities the scenario can further be narrowed down and characterized as a fire.

FIGS. 6A through 6C and 7A through 7B illustrate various fused sensor datasets such as may be utilized to configure an expert module, train an artificial intelligence, or otherwise configure an analysis engine in order to rapidly identify emergencies (410), false alarms (416), and other characteristics (422) as has been described. In particular, use of fused datasets combined with annotation to identify the real-world scenario and particularly relevant characteristics of the data may be used by a machine learning process or other pattern recognition process to swiftly identify analogous scenarios that are detected in real time. As has been described, it may be particularly advantageous to train or otherwise configure a fusion analysis engine to identify (412, 418, 422) scenarios within emergent data using a sensor fusion fingerprint (SFF) model, whereby the discrete datasets from multiple sensors are fused and considered in context with each other, and in context with the overall fused data timeline (e.g., which may be organized or interpreted as a time index), as opposed to singularly evaluating each sensor dataset in isolation, and then attempting to resolve the results of isolated analysis in context. In comparison, analysis using the SFF model will provide results more quickly (e.g., a plurality of analysis results that might be possible when analyzing isolated values may be quickly excluded by analyzing those values in context with each other), and will provide more accurate results (e.g., uniquely "fingerprinting" different scenarios will provide for a more complete and varies set of possible analysis results).

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A system comprising:
   (a) a sensor module that comprises a plurality of sensors configured to produce measurements of discrete characteristics of an environment in which the sensor module is located;
   (b) one or more processors configured to:
      (i) receive a set of sensor data produced by the plurality of sensors over a period of time, wherein the set of sensor data is associated with a time index and comprises a plurality of discrete characteristic measurements;
      (ii) perform a fusion analysis process based on the time index and the set of sensor data to create a fused sensor dataset, wherein the fused sensor dataset identifies one or more correspondences between the plurality of discrete characteristic measurements during the period of time; and
      (iii) determine whether an emergency scenario exists based upon the fused sensor dataset and, where the emergency scenario exists, provide an emergency notification.

2. The system of claim 1, wherein the one or more processors are further configured to determine whether a false alarm scenario exists based upon the fused sensor dataset and, where the false alarm scenario exists, provide a false alarm notification.

3. The system of claim 1, wherein the sensor module further comprises an audio indicator, and wherein the one or more processors are further configured to, when providing the emergency notification, cause the audio indicator of the sensor module to emit an audible alert.

4. The system of claim 1, wherein the sensor module includes an audio indicator and a module processor that is configured to:
   (i) in response to the set of sensor data being produced, perform a local analysis of the set of sensor data to determine whether the emergency scenario exists prior to or in parallel with providing the set of sensor data to the one or more processors; and
   (ii) where the emergency scenario exists based on the local analysis, provide a local emergency notification via the audio indicator.

5. The system of claim 4, wherein the one or more processors are further configured to, after determining that the emergency scenario does not exist based on the fused sensor dataset:
   (i) cause the sensor module to cease providing the local emergency notification; and
   (ii) provide a false alarm notification.

6. The system of claim 1, further comprising a database in communication with the one or more processors, wherein the database is configured to store a plurality of sensor fusion fingerprints, wherein each of the plurality of sensor fusion fingerprints:
   (i) identifies a pattern of correspondence between pluralities of discrete characteristic measurements over time; and
   (ii) is associated with a particular scenario; and
wherein the one or more processors are configured to perform the fusion analysis process based on the time index, the plurality of discrete characteristic measurements, and the plurality of sensor fusion fingerprints.

7. The system of claim 6, wherein the one or more processors are further configured to provide a subset of the plurality of fusion fingerprints to the sensor module, wherein the sensor module further comprises a module processor that is configured to perform a local analysis of the set of sensor data based upon the subset of the plurality of fusion fingerprints prior to or in parallel with providing the set of sensor data to the one or more processors.

8. The system of claim 1, wherein the plurality of discrete characteristic measurements includes two or more of chemical content, humidity, temperature, small particulate content, and large particulate content, and wherein the period of time corresponding to the time index is between about 10 seconds and about 60 seconds.

9. The system of claim 1, wherein the plurality of discrete characteristic measurements includes two or more of chemical content, humidity, temperature, and particulate content, and wherein the one or more processors are further configured to, when performing the fusion analysis process:
   (i) identify a first change in a first characteristic of the plurality of discrete characteristic measurements at a first time in the time index;
   (ii) identify a corresponding second change in a second characteristic of the plurality of discrete characteristic measurements at a second time in the time index; and
   (iii) where the first change, the second change, and an intervening time between the first time and the second time correspond to a first configured scenario pattern, determine whether the emergency scenario exists based on the first configured scenario pattern.

10. The system of claim 9, wherein the plurality of discrete characteristic measurements includes three or more of chemical content, humidity, temperature, and particulate content, and wherein the one or more processors are further configured to, when performing the fusion analysis process:
    (i) identify a corresponding third change in a third characteristic of the plurality of discrete characteristic measurements at a third time in the time index; and
    (ii) where the first change, the second change, the third change, and a set of intervening times between the first time, the second time, and the third time correspond to a second configured scenario pattern, determine whether the emergency scenario exists based on the second configured scenario pattern.

11. The system of claim 9, wherein:
    (i) the first change to the first characteristic is a rise in particulate content at the first time;
    (ii) the second change to the second characteristic is a corresponding rise in chemical content at the second time, wherein the second time occurs prior to the first time; and
    (iii) the one or more processors are further configured to, where the rise in particular content, the corresponding rise in chemical content, and the intervening time correspond to a configured fire emergency pattern, determine that the emergency scenario exists.

12. The system of claim 9, wherein:
    (i) the first change to the first characteristic is a rise in particulate content at the first time;
    (ii) the second change to the second characteristic is a corresponding rise in humidity at the second time, wherein the first time and the second time occur at substantially similar times within the time index; and (iii) where the rise in particular content, the corresponding rise in humidity, and the intervening time correspond to a configured false alarm pattern, determine that the emergency scenario does not exist.

13. A method comprising configuring a sensor module that comprises a plurality of sensors configured to produce measurements of discrete characteristics of an environment and, with one or more processors:
(a) receiving a set of sensor data produced by the plurality of sensors over a period of time, wherein the set of sensor data is associated with a time index and comprises a plurality of discrete characteristic measurements;
(b) performing a fusion analysis process based on the time index and the set of sensor data to create a fused sensor dataset, wherein the fused sensor dataset identifies one or more correspondences between the plurality of discrete characteristic measurements during the period of time; and
(c) determining whether an emergency scenario exists based upon the fused sensor dataset and, where the emergency scenario exists, providing an emergency notification.

14. The method of claim 13, further comprising, with the one or more processors:
(a) storing, on a database, a plurality of sensor fusion fingerprints, wherein each of the plurality of sensor fusion fingerprints:
(i) identifies a pattern of correspondence between pluralities of discrete characteristic measurements over time; and
(ii) is associated with a particular scenario;
(b) performing the fusion analysis process based on the time index, the plurality of discrete characteristic measurements, and the plurality of sensor fusion fingerprints; and
(c) providing a subset of the plurality of fusion fingerprints to the sensor module, wherein the sensor module further comprises a module processor that is configured to perform a local analysis of the set of sensor data based upon the subset of the plurality of fusion fingerprints prior to or in parallel with providing the set of sensor data to the one or more processors.

15. The method of claim 13, wherein the plurality of discrete characteristic measurements includes two or more of chemical content, humidity, temperature, and particulate content, the method further comprising, when performing the fusion analysis process:
(a) identifying a first change in a first characteristic of the plurality of discrete characteristic measurements at a first time in the time index;
(b) identifying a corresponding second change in a second characteristic of the plurality of discrete characteristic measurements at a second time in the time index; and
(c) where the first change, the second change, and an intervening time between the first time and the second time correspond to a first configured scenario pattern, determining whether the emergency scenario exists based on the first configured scenario pattern.

16. The method of claim 15, wherein the plurality of discrete characteristic measurements includes three or more of chemical content, humidity, temperature, and particulate content, the method further comprising, when performing the fusion analysis process:
(a) identifying a corresponding third change in a third characteristic of the plurality of discrete characteristic measurements at a third time in the time index; and
(b) where the first change, the second change, the third change, and a set of intervening times between the first time, the second time, and the third time correspond to a second configured scenario pattern, determining whether the emergency scenario exists based on the second configured scenario pattern.

17. The method of claim 15, wherein:
(a) the first change to the first characteristic is a rise in particulate content at the first time;
(b) the second change to the second characteristic is a corresponding rise in chemical content at the second time, wherein the second time occurs prior to the first time; and
(c) the method further comprising where the rise in particular content, the corresponding rise in chemical content, and the intervening time correspond to a configured fire emergency pattern, determining that the emergency scenario exists.

18. The method of claim 15, wherein:
(a) the first change to the first characteristic is a rise in particulate content at the first time;
(b) the second change to the second characteristic is a corresponding rise in humidity at the second time, wherein the first time and the second time occur at substantially similar times within the time index; and
(c) the method further comprising where the rise in particular content, the corresponding rise in humidity, and the intervening time correspond to a configured false alarm pattern, determining that the emergency scenario does not exist.

19. A sensor module comprising:
(a) a housing;
(b) a plurality of sensors located within the housing and configured to produce measurements of discrete characteristics of the environment;
(c) an emergency indicator operable to provide an emergency notification; and
(d) one or more processors configured to:
(i) receive a set of sensor data produced by the plurality of sensors over a period of time, wherein the set of sensor data is associated with a time index and comprises a plurality of discrete characteristic measurements;
(ii) perform a fusion analysis process based on the time index and the set of sensor data to create a fused sensor dataset, wherein the fused sensor dataset identifies one or more correspondences between the plurality of discrete characteristic measurements during the period of time; and
(iii) determine whether an emergency scenario exists based upon the fused sensor dataset and, where the emergency scenario exists, cause the emergency indicator to provide the emergency notification.

20. The sensor module of claim 19 further comprising a power source selected from the group consisting of replaceable batteries, rechargeable batteries, solar power sources, or a combination thereof.

* * * * *